(12) United States Patent
Okumura et al.

(10) Patent No.: US 8,409,757 B2
(45) Date of Patent: Apr. 2, 2013

(54) LITHIUM SECONDARY BATTERY

(75) Inventors: Takefumi Okumura, Hitachinaka (JP); Shigetaka Tsubouchi, Tokai (JP); Ryo Inoue, Hitachinaka (JP)

(73) Assignee: Hitachi Vehicle Energy, Ltd., Hitachinaka-shi (JP)

( * ) Notice: Subject to any disclaimer, the term of this patent is extended or adjusted under 35 U.S.C. 154(b) by 620 days.

(21) Appl. No.: 12/695,343

(22) Filed: Jan. 28, 2010

(65) Prior Publication Data

US 2010/0248037 A1 Sep. 30, 2010

(30) Foreign Application Priority Data

Mar. 30, 2009 (JP) ................................. 2009-080855

(51) Int. Cl.
*H01M 2/14* (2006.01)
(52) U.S. Cl. ........ 429/332; 429/324; 429/326; 429/330; 429/331
(58) Field of Classification Search .................. None
See application file for complete search history.

(56) References Cited

U.S. PATENT DOCUMENTS

| | | | |
|---|---|---|---|
| 2004/0106047 A1 * | 6/2004 | Mie et al. ................ | 429/324 |
| 2006/0141341 A1 | 6/2006 | Nishino et al. | |
| 2007/0243463 A1 | 10/2007 | Matsui et al. | |
| 2008/0138703 A1 | 6/2008 | Deguchi et al. | |
| 2010/0248036 A1 | 9/2010 | Okumurai et al. | |
| 2012/0045698 A1 | 2/2012 | Shima | |

FOREIGN PATENT DOCUMENTS

| | | |
|---|---|---|
| EP | 0787749 * | 4/2003 |
| WO | WO 2006/030624 A1 | 3/2006 |
| WO | WO 2006/067957 A1 | 6/2006 |
| WO | WO 2006/068143 A1 | 6/2006 |
| WO | WO 2006/137224 A1 | 12/2006 |

OTHER PUBLICATIONS

Hitoshi Ota et al., "Analysis of Vinylene Carbonate Derived SEI Layers on Graphite Anode", Journal of The Electrochemical Society, 151 (10) A1659-A1669 (2004), pp. 1659-1669.
Japanese Office Action dated Oct. 4, 2011 including English-language translation (Fourteen (14) sheets).

* cited by examiner

*Primary Examiner* — Robert Xu
(74) *Attorney, Agent, or Firm* — Crowell & Moring LLP

(57) ABSTRACT

A lithium secondary battery is intended to suppress deterioration upon storage at high temperature of 50° C. or higher without deteriorating the output characteristics at a room temperature. The battery includes a positive electrode capable of occluding and releasing lithium ions, a negative electrode capable of occluding and releasing lithium ions, a separator disposed between the positive electrode and the negative electrode, and an electrolyte. The electrolyte contains a compound having a double bond in the molecule and a compound having a plurality of polymerizable functional groups in the molecule, and the electrolyte contains a compound represented by formula (4):

(Formula 4)

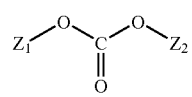

(in which $Z_1$ and $Z_2$ each represent any one of an allyl group, a methallyl group, a vinyl group, an acryl group, and a methacryl group).

3 Claims, 1 Drawing Sheet

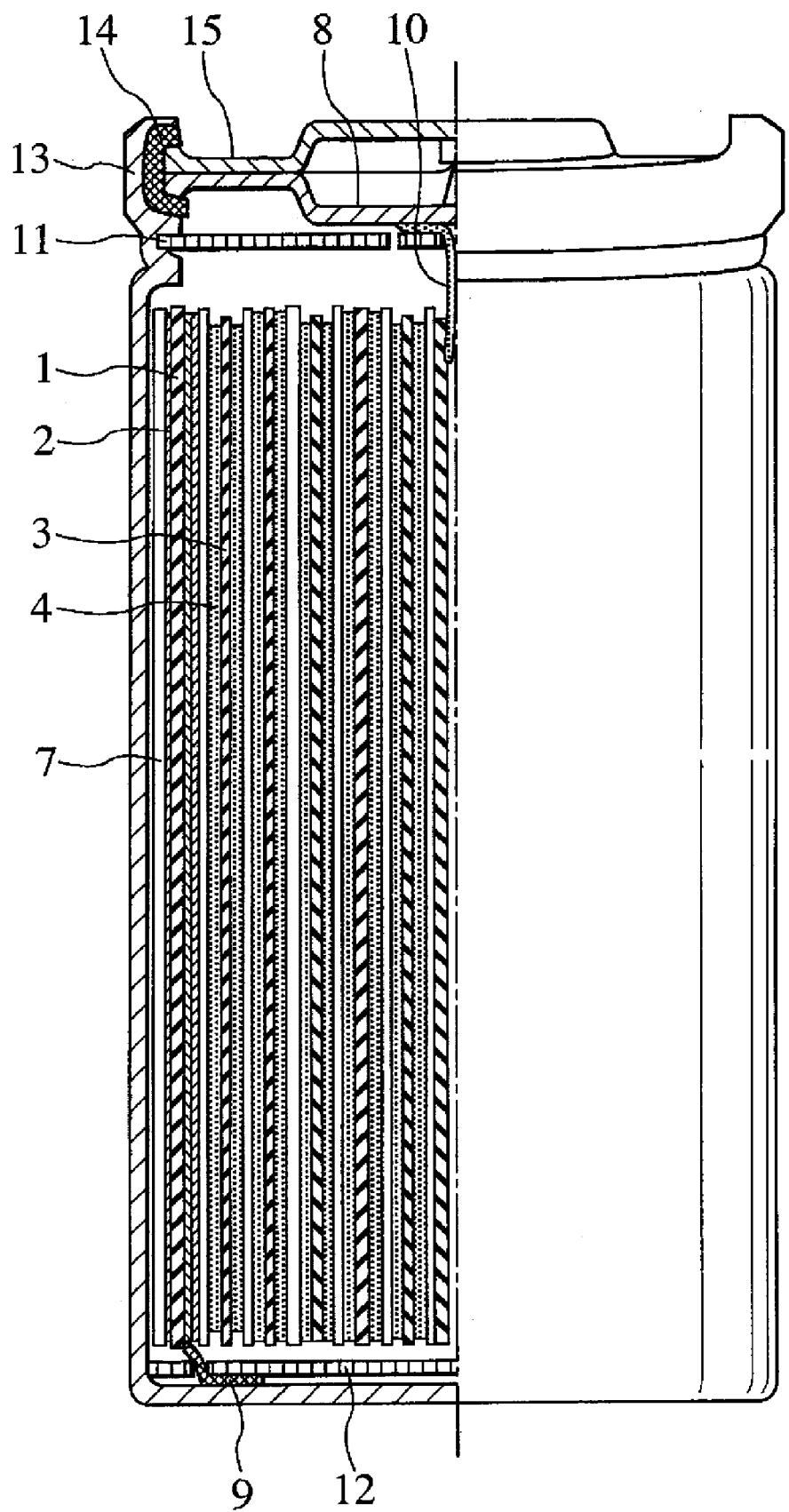

LITHIUM SECONDARY BATTERY

BACKGROUND OF THE INVENTION

1. Field of the Invention

The present invention relates to a lithium secondary battery.

2. Description of the Related Art

With a view point of environmental protection and energy saving, hybrid cars that use in combination an engine and a motor together as a power source have been developed and put to actual products. Further, development of fuel cell type hybrid cars that use fuel cells instead of engines has been made vigorously for future use.

Secondary batteries capable of charging/discharging electric energy repetitively are technically essential as energy sources for hybrid cars.

Among them, a lithium secondary battery is a battery having a feature of a high energy-density, where operation voltage is high and high power is obtained easily. Such a lithium secondary battery is important more and more as the power source of the hybrid cars in the future.

For the lithium secondary battery which is used as the power source for the hybrid cars, one of its technical subjects is to suppress the increase of resistance during high temperature storage at 50° C. or higher.

To suppress the increase of resistance during storage at high temperature, a countermeasure of adding a compound such as vinylene carbonate to an electrolyte has been proposed.

A battery in which deterioration during storage at 60° C. can be suppressed by adding 2 wt % vinylene carbonate to an electrolyte comprising, for example, $LiPF_6$, ethylene carbonate, and dimethyl carbonate has been proposed in Journal of The Electrochemical Society, 151 (10) A1659-A1669 (2004).

SUMMARY OF THE INVENTION

However, the technique utilizing vinylene carbonate proposed so far can suppress deterioration during storage at high temperature by increasing the addition amount, this involves a problem that the power lowers at a room temperature. That is, an object of the present invention is to provide a lithium secondary battery that is intended to suppress deterioration during storage at high temperature of 50° C. or higher without deteriorating the output characteristics at a room temperature.

The present invention provides a lithium secondary battery having a positive electrode capable of occluding and releasing lithium ions, a negative electrode capable of occluding and releasing lithium ions, a separator disposed between the positive electrode and the negative electrode, and an electrolyte, in which the electrolyte contains a compound having a double bond in the molecule and a compound having a plurality of polymerizable functional groups in the molecule.

The electrolyte contains a cyclic carbonate represented by formula (1):

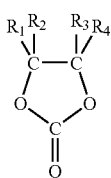

(Formula 1)

in which, $R_1$, $R_2$, $R_3$, and $R_4$ each represent any one of hydrogen, fluorine, chlorine, an alkyl group having 1 to 3-carbon atoms, and a fluorinated alkyl group having 1 to 3 carbon atoms, a linear carbonate represented by formula (2):

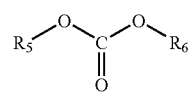

(Formula 2)

in which $R_5$ and $R_6$ each represent any one of hydrogen, fluorine, chlorine, an alkyl group having 1 to 3-carbon atoms, and a fluorinated alkyl group having 1 to 3 carbon atoms, a compound represented by formula (3):

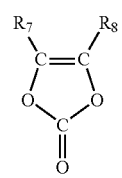

(Formula 3)

in which $R_7$ and $R_8$ each represent any one of hydrogen, fluorine, chlorine, an alkyl group having 1 to 3-carbon atoms, and a fluorinated alkyl group having 1 to 3 carbon atoms, and a compound represented by formula (4):

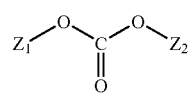

(Formula 4)

in which $Z_1$ and $Z_2$ each represent any one of an allyl group, a methallyl group, a vinyl group, an acryl group, and methacryl group.

The present invention can provide a lithium secondary battery that suppresses deterioration during storage at high temperature in a state of maintaining the output characteristics of the lithium secondary battery at a room temperature.

BRIEF DESCRIPTION OF THE DRAWING

Other objects and advantages of the invention will become apparent from the following description of embodiments with reference to the accompanying drawings in which:

FIG. 1 is a cross sectional view for one-half part of a wound battery according to a preferred embodiment of the invention.

DETAILED DESCRIPTION OF THE PREFERRED EMBODIMENTS

A lithium secondary battery according to the invention is a lithium secondary battery having a positive electrode capable of occluding and releasing lithium ions, a negative electrode capable of occluding and releasing lithium ions, a separator disposed between the positive electrode and the negative electrode, and an electrolyte, in which the electrolyte contains a cyclic carbonate represented by formula (1):

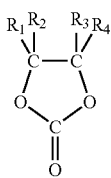

(Formula 1)

in which, $R_1$, $R_2$, $R_3$, and $R_4$ each represent any one of hydrogen, fluorine, chlorine, an alkyl group having 1 to 3-carbon atoms, and a fluorinated alkyl group having 1 to 3 carbon atoms, a linear carbonate represented by formula (2):

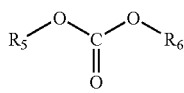

(Formula 2)

in which $R_5$ and $R_6$ each represent any one of hydrogen, fluorine, chlorine, an alkyl group having 1 to 3-carbon atoms and a fluorinated alkyl group having 1 to 3 carbon atoms, a compound represented by formula (3):

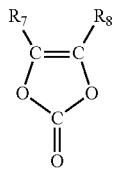

(Formula 3)

in which $R_7$ and $R_8$ each represent any one of hydrogen, fluorine, chlorine, an alkyl group having 1 to 3 carbon atoms, and a fluorinated alkyl group having 1 to 3 carbon atoms, and a compound represented by formula (4):

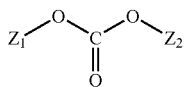

(Formula 4)

in which $Z_1$ and $Z_2$ each represent any one of an allyl group, a methallyl group, a vinyl group, an acryl group, and methacryl group. The positive electrode has a positive electrode mix, and a positive electrode current collector. A positive electrode mix layer means a mix layer formed by coating a positive electrode mix containing a positive electrode active material, a conductive material, and a binder on the positive electrode current collector.

Further, the negative electrode has a negative electrode mix, and a negative electrode current collector. A negative electrode mix layer means a mix layer formed by coating a negative electrode mix containing a negative electrode active material, a conductive material, and a binder on the negative electrode current collector.

Further, the lithium secondary battery according to the invention is a lithium secondary battery having an positive electrode capable of occluding and releasing lithium ions, a negative electrode capable of occluding and releasing lithium ions, a separator disposed between the positive electrode and negative electrode, and an electrolyte, and having a self heat generating rate at 65° C. of 0.01° C./min or less based on the evaluation by an adiabatic calorimeter.

The positive electrode according to the example of the invention has a positive electrode active material, and the positive electrode active material preferably contains a lithium composite oxide represented by the compositional formula: $Li_\alpha Mn_x M1_y M2_z O_2$ (in which M1 is at least one element selected from Co and Ni, and M2 is at least one element selected from Co, Ni, Al, B, Fe, Mg, and Cr, x+y+z=1, $0<\alpha<1.2$, $0.2 \leq x \leq 0.6$, $0.2 \leq y \leq 0.4$, and $0.05 \leq z \leq 0.4$).

The negative electrode has a negative electrode active material, and the negative electrode active material preferably has at least one element of carbonaceous materials, oxides containing group IV elements and nitrides containing group IV elements.

Preferably, the compositional ratio of the compound represented by formula (1) is from 18.0 to 30.0 vol %, the compound represented by formula (2) is from 74.0 to 81.8 vol %, the compound represented by formula (3) is from 0.1 to 1.0 vol %, and the compound represented by formula (4) is from 0.1 to 1.0 vol %, and the total volume for the compound represented by formula (1), the compound represented by formula (2), the compound represented by formula (3), and the compound represented by formula (4) is 100 vol %. When the compositional ratio of the compound represented by formula (3) or the formula (4) is 1.0 vol % or more, this is not preferred since the internal resistance of the battery increases to result in lowering of the battery power.

Preferably, the compound represented by formula (1) is ethylene carbonate, the compound represented by formula (2) is at least one of ethyl methyl carbonate and dimethyl carbonate, the compound represented by formula (3) is vinylene carbonate, and the compound represented by formula (4) is dimethacryl carbonate.

As the compound represented by formula (1), ethylene carbonate (EC), trifluoropropylene carbonate (TFPC), chloroethylene carbonate (ClEC), fluoroethylene carbonate (FEC), trifluoroethylene carbonate (TFEC), difluoroethylene carbonate (DFEC), vinyl ethylene carbonate (VEC), etc. can be used. In particular, EC is used preferably with a view point of forming a coating film over the negative electrode. Addition of a small amount (2 vol % or less) of ClEC, FEC, TFEC, or VEC also contributes to the formation of electrode coating film and provides good cycle characteristics. TFPC or DFEC may be used with a small addition amount (2 vol % or less) with a view point of forming a coating film over the positive electrode. The compound represented by formula (2) usable herein includes, for example, dimethyl carbonate (DMC), ethyl methyl carbonate (EMC), diethyl carbonate (DEC), methylpropyl carbonate (MPC), ethyl-propyl carbonate (EPC), trifluoromethylethyl carbonate (TFMEC), and 1,1,1-trifluoroethylmethyl carbonate (TFEMC). DMC is a highly compatible solvent and is suitable to be used in admixture with EC, etc. DEC has a melting point lower than that of DMC and is suitable for low temperature (−30° C.) characteristics. Since EMC has an asymmetric molecular structure and low melting point, it is suitable in view of the low temperature characteristics. Since EPC and TFMEC have propylene side chains and an asymmetric molecular structure, they are suitable as the solvent for controlling the low temperature characteristics. Since TFEMC is fluorinated for a portion of the molecule to increase a dipole moment, it is suitable for maintaining dissociation property of a lithium salt at low temperature and suitable in view of the low temperature characteristics. The compound represented by formula (3) usable herein includes, for example, vinylene carbonate (VC), methyl vinylene carbonate (MVC), dimethyl vinylene carbonate (DMVC), ethyl vinylene carbonate (EVC), and diethyl vinylene carbonate (DEVC). It is considered that VC has a small molecular weight and forms a dense electrode coating film. It is considered that MVC, DMVC, EVC, DEVC, etc, in which an alkyl group is substituted on VC form an electrode coating film of low density depending on the length of the alkyl chain, and it is considered that they function effectively for the improvement of the low temperature characteristics. The compound represented by formula (4) includes, for example, dimethallyl carbonate (DMAC).

The lithium secondary battery according to the invention has a positive electrode capable of occluding and releasing lithium ions, a negative electrode capable of occluding and releasing lithium ions, a separator disposed between the positive electrode and the negative electrode, and an electrolyte, in which the electrolyte contains, as a solvent, a compound represented by formula (4).

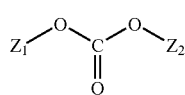

(Formula 4)

in which $Z_1$ and $Z_2$ each represent any one of an allyl group, a methallyl group, a vinyl group, an acryl group, and methacryl group.

The compound represented by formula (4) is preferably dimethallyl carbonate.

Then, the lithium salt used as the electrolyte is not particularly restricted, and inorganic lithium salts, such as $LiPF_6$, $LiBF_4$, $LiClO_4$, LiI, LiCl, and LiBr, and organic lithium salts such as $LiB[OCOCF_3]_4$, $LiB[OCOCF_2CF_3]_4$, $LiPF_4(CF_3)_2$, $LiN(SO_2CF_3)_2$, $LiN(SO_2CF_2CF_3)_2$, etc. can be used. In particular, $LiPF_6$ used frequently in domestic batteries is a suitable material with a view point of stability for the quality. $LiB[OCOCF_3]_4$ is an effective material since this is excellent in the dissociation characteristics and the solubility and shows a high conductivity at low concentration.

The positive electrode is formed by coating a positive electrode mix layer comprising a positive electrode active material, an electron conducting material, and a binder on an aluminum foil as a current collector. A conductive agent may be further added to the positive electrode mix layer for decreasing the electronic resistance. The positive electrode active material is preferably a lithium composite oxide represented by the compositional formula: $Li_\alpha Mn_x M1_y M2_z O_2$ (in which M1 is at least one element selected from Co and Ni, M2 is at least one element selected from Co, Ni, Al, B, Fe, Mg, and Cr, $x+y+z=1$, $0<\alpha<1.2$, $0.2 \leq x \leq 0.6$, $0.2 \leq y \leq 0.4$, and $0.05 \leq z \leq 0.4$). Among them, it is more preferred that M1 is Ni or Co and M2 is Co or Ni. $LiMn_{1/3}Ni_{1/3}Co_{1/3}O_2$ is further preferred. In the composition, capacity can be increased when Ni is increased, power at a low temperature can be improved when Co is increased, and material cost can be suppressed when Mn is increased. Further, the additive element is effective for stabilizing the cycle characteristics. In addition, an orthorhombic phosphate compound represented by the general formula: $LiM_xPO_4$ (M: Fe or Mn, and $0.01 \leq X \leq 0.4$) or $LiMn_{1-x}M_xPO_4$ (M: bivalent cation other than Mn, and $0.01 \leq X \leq 0.4$) having symmetricity of a space group Pmnb may also be used. In particular, $LiMn_{1/3}Ni_{1/3}Co_{1/3}O_2$ has a high low temperature characteristics and cycle stability and is suitable as a lithium battery material for hybrid cars (HEV). Any binder may be used so long as it can adhere closely to the material constituting the positive electrode and a current collector for the positive electrode and includes, for example, a homopolymer or a copolymer of vinylidene fluoride, tetrafluoroethylene, acrylonitrile, and ethylene oxide, and styrene-butadiene rubber. The conductive agent is, for example, a carbon material such as carbon black, graphite, carbon fiber, and metal carbide, which may be used each alone or in admixture.

The negative electrode is formed by coating a negative electrode mix layer comprising a negative electrode active material and a binder on a copper foil as a current collector. To decrease the electronic resistance, a conductive agent may also be further added to the negative electrode mix layer. Materials usable as the negative electrode active material include: carbonaceous materials such as natural graphite; composite carbonaceous materials in which a coating film which is formed by a dry CVD (Chemical Vapor Deposition) method or a wet spray method is formed on natural graphite; artificial graphite prepared by baking a resin material such as epoxy or phenol or pitch type materials obtained from petroleum or coal as the starting material; carbonaceous materials such as amorphous carbon materials; lithium metal capable of occluding and releasing lithium by forming a compound with lithium; and oxides or nitrides of group IV elements such as silicon, germanium, or tin capable of occluding and releasing lithium by forming compounds with lithium by intercalation into crystal gaps. They are sometimes referred to generally as a negative electrode active material. In particular, the carbonaceous materials are excellent materials in view of high conductivity, low temperature characteristics and cycle stability. Among the carbonaceous materials, those having wide carbon interplanar spacing ($d_{002}$) are excellent in rapid charge/discharge and low temperature characteristics and are suitable. However, since the materials having wide $d_{002}$ sometimes cause lowering of capacity at the initial stage of charge and show low charge/discharge efficiency, $d_{002}$ is preferably 0.390 nm or less, and such carbonaceous materials are sometimes referred to as pseudo anisotropic carbon. Further, for constituting the electrode, carbonaceous materials of high conductivity such as graphite, amorphous or activated carbon may also be mixed. Alternatively, as the graphite materials, those materials having the features to be shown in (1) to (3) below may also be used.

(1) Materials having R value ($I_D/I_G$) of 0.20 or more and 0.40 or less as the intensity ratio between the peak intensity ($I_D$) within a range from 1300 to 1400 $cm^{-1}$ measured by Raman spectroscopy and a peak intensity ($I_G$) within a range from 1580 to 1620 $cm^{-1}$ measured by Raman spectroscopy.

(2) Materials having a half-value width $\Delta$ value of 40 $cm^{-1}$ or more and 100 $cm^{-1}$ or less for a peak within a range from 1300 to 1400 $cm^{-1}$ measured by Raman spectroscopy.

(3) Materials having an intensity ratio X-value ($I_{(110)}/I_{(004)}$) of 0.10 or more and 0.45 or less between the peak intensity ($I_{(110)}$) at the (110) face and the peak intensity ($I_{(004)}$) at the (004) face in X-ray diffractometry.

As the binder, any material capable of closely adhering to the material constituting the negative electrode and the current collector for the negative electrode may be used and includes, for example, homopolymers or copolymers of vinylidene fluoride, tetrafluoride ethylene, acrylonitrile and ethylene oxide, and styrene-butadiene rubber. The conductive agent comprises, for example, carbon materials such as carbon black, graphite, carbon fiber, and metal carbide, and they may be used each alone or in admixture.

As described above, since the lithium secondary battery as an embodiment of the invention can provide a lithium secondary battery capable of suppressing deterioration during storage at high temperature of 50° C. or higher without deteriorating the output characteristics at a room temperature when compared with existent secondary batteries, it can be used generally as a power source for hybrid cars, a power source or a back-up power source for electromotive control systems in automobiles that are possibly exposed to a high temperature of 50° C. or higher and it is suitable also as a power source for industrial equipments such as electromotive tools and forklift.

A best mode for practicing the invention is to be described with reference to specific examples.

Example 1

Manufacture of Wound Battery

A wound battery of this example was manufactured by the method shown below. FIG. 1 shows a cross sectional view for one-half part of a wound battery.

A positive electrode material paste was at first prepared by using $LiMn_{1/3}Ni_{1/3}CO_{1/3}O_2$ as a positive electrode active material, carbon black (CB1) and graphite (GF2) as an electronic conductive material, and polyvinylidene fluoride (PVDF) as a binder, and using NMP (N-methylpyrrolidone) as a solvent such that the solid content weight in a dried state was at a ratio of: $LiMn_{1/3}Ni_{1/3}Co_{1/3}O_2$:CB1:GF2:PVDF=86:9:2:3.

The positive electrode material paste was coated over an aluminum foil as a positive electrode current collector 1, dried at 80° C., pressed by a pressing roller, and dried at 120° C. to form a positive electrode mix layer 2 to the positive electrode current collector 1.

Then, a negative electrode material paste was prepared by using a pseudo anisotropic carbon which is amorphous carbon as a negative electrode active material, carbon black (CB2) as a conductive material, and PVDF as a binder, and using NMP as a solvent such that the solid content weight in a dried state was at a ratio of: pseudo anisotropic carbon: CB2: PVDF=88:5:7.

The negative electrode material paste was coated over a copper foil as a negative electrode current collector 3, dried at 80° C., pressed by a pressing roller, and dried at 120° C. to form a negative electrode mix layer 4 to the negative electrode current collector 3.

An electrolyte was prepared by using solvents mixed at a volumic compositional ratio of EC:VC:DMAC:DMC:EMC=20:0.8:0.2:39.5:39.5 as the electrolyte and dissolving 1 M of $LiPF_6$ as a lithium salt.

A separator 7 is sandwiched between the thus prepared electrodes to form a wound group and inserted in a negative electrode battery can 13. Then, for current collection to the negative electrode, one end of a negative electrode lead 9 made of nickel was welded to the negative electrode current collector 3 and the other end thereof was welded to the negative electrode battery can 13. Further, for current collection to the positive electrode, one end of a positive electrode lead 10 made of aluminum was welded to the positive electrode current collector 1 and the other end thereof was welded to a current shut-off valve 8 and, further, electrically connected by way of the current shut-off valve 8 with a positive electrode battery lid 15. A wound battery was manufactured by further injecting a liquid electrolyte and caulking the same.

In FIG. 1, a positive electrode insulator 11, a negative electrode insulator 12, a gasket 14, and a positive electrode battery lid 15 are shown.

(Evaluation for Battery)

The wound battery shown in FIG. 1 was evaluated for direct current resistance (DCR) at 25° C., battery voltage fluctuation during storage at 65° C. and self heat generating rate. Each of the evaluation methods is to be described below.
<Evaluation Method for Direct Current Resistance>

A battery was charged to 4.1 V at a constant current of 0.7 A, charged till the current value reached 20 mA at a constant voltage of 4.1 V and, after the operation recess for 30 minutes, discharged at 0.7 A to 2.7 V. The operations were repeated three times.

Then, the battery was charged to 3.8 V at a constant current of 0.7 A, discharged at 10 A for 10 seconds, and then again charged to 3.8 V at the constant current, discharged at 20 A for 10 seconds, charged again to 3.8 V, and discharged at 30 A for 10 seconds.

The direct current resistance of the battery was evaluated based on the IV characteristics in this process. Table 1 shows the result of the measurement.
<Method of Evaluating Battery Voltage Fluctuation During Storage at 65° C.>

The battery was charged to 4.1 V at a constant current of 0.7 A, charged till the current value reached 20 mA at a constant voltage of 4.1 V and, after the operation recess for 30 minutes, discharged to 2.7 V at 0.7 A. The operations were repeated three times.

Then, the battery was charged to 4.1 V at a constant current of 0.7 A, and left as it was for 30 minutes. The battery was placed in a thermostatic bath at 65° C. and voltage after leaving for 30 minutes was measured. A voltage after leaving for further 10 days was measured. Table 1 shows the result of the measurement.
<Method of Evaluating Self Heat Generating Rate>

A battery was charged to 4.1 V at a constant current of 0.7 A, charged till the current value reached 20 mA at a constant voltage of 4.1 V and, after the operation recess for 30 minutes, discharged to 2.7 V at 0.7 A. The operations were repeated three times.

Then, the battery was charged to 4.1 V at a constant current of 0.7 A, left as it was for 30 minutes, and the self heat generating rate at 65° C. was measured by an adiabatic calorimeter. Table 1 shows the result of the measurement.

Example 2

A battery was manufactured and evaluated in the same manner as in Example 1 except for using a solvent mixed at a volumic compositional ratio of EC:VC:DMAC:DMC:EMC=20:0.5:0.5:39.5:39.5 as an electrolyte. Table 1 shows the result thereof.

Example 3

A battery was manufactured and evaluated in the same manner as in Example 1 except for using a solvent mixed at a volumic compositional ratio of EC:VC:DMAC:DMC:EMC=20:0.2:0.8:39.5:39.5 as an electrolyte. Table 1 shows the result thereof.

Example 4

A battery was manufactured and evaluated in the same manner as in Example 1 except for using a solvent mixed at a volumic compositional ratio of EC:VC:DMAC:DMC:EMC=20:0:0.8:39.6:39.6 as an electrolyte. Table 1 shows the result thereof.

Example 5

A battery was manufactured and evaluated in the same manner as in Example 1 except for using a solvent mixed at a volumic compositional ratio of EC:VC:DMAC:DMC:EMC=20:0:2:39:39 as an electrolyte. Table 1 shows the result thereof.

TABLE 1

| | Electrolyte composition | | | | | DCR at 25° C. (mΩ) | Voltage fluctuation ratio at 65° C. vs. Comparative Example 3 (%) | Self heat generating rate at 65° C. (° C./min) |
|---|---|---|---|---|---|---|---|---|
| | LiPF$_6$ (M) | EC (vol %) | VC (vol %) | DMAC (vol %) | DMC (vol %) | EMC (vol %) | | | |
| Example 1 | 1 | 20 | 0.8 | 0.2 | 39.5 | 39.5 | 66 | 95 | <0.01 |
| Example 2 | 1 | 20 | 0.5 | 0.5 | 39.5 | 39.5 | 67 | 90 | <0.01 |
| Example 3 | 1 | 20 | 0.2 | 0.8 | 39.5 | 39.5 | 66 | 85 | <0.01 |
| Example 4 | 1 | 20 | 0 | 0.8 | 39.6 | 39.6 | 67 | 85 | <0.01 |
| Example 5 | 1 | 20 | 0 | 2 | 39 | 39 | 68 | 83 | <0.01 |
| Comp. Example 1 | 1 | 20 | 0 | 0 | 40 | 40 | 62 | 120 | 0.08 |
| Comp. Example 2 | 1 | 20 | 1 | 0 | 39.5 | 39.5 | 70 | 105 | 0.04 |
| Comp. Example 3 | 1 | 20 | 2 | 0 | 39 | 39 | 75 | 100 | 0.02 |

Comparative Example 1

A battery was manufactured and evaluated in the same manner as in Example 1 except for using a solvent mixed at a volumic compositional ratio of EC:VC:DMAC:DMC:EMC=20:0:0:40:40 as an electrolyte. Table 1 shows the result thereof.

Comparative Example 2

A battery was manufactured and evaluated in the same manner as in Example 1 except for using a solvent mixed at a volumic compositional ratio of EC:VC:DMAC:DMC:EMC=20:1:0:39.5:39.5 as an electrolyte. Table 1 shows the result thereof.

Comparative Example 3

A battery was manufactured and evaluated in the same manner as in Example 1 except for using a solvent mixed at a volumic compositional ratio of EC:VC:DMAC:DMC:EMC=20:2:0:39:39 as an electrolyte. Table 1 shows the result thereof.

It can be seen that the batteries described in Examples 1 to 3 with addition of VC and DMAC to the electrolyte showed less voltage fluctuation and self heat generating rate and less deterioration of performance during storage at a high temperature compared with the batteries without mixing them described in Comparative Examples 1 to 3. Further, DCR at 25° C. was also low. As described above, Examples 1 to 3 can provide batteries that suppress the deterioration during storage at high temperature of 50° C. or higher without deteriorating the output characteristics at room temperature.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A lithium ion secondary battery comprising:
a positive electrode, a negative electrode, a separator disposed between the positive electrode and the negative electrode, and an electrolyte,
wherein the electrolyte contains a compound represented by formula (4):

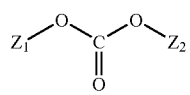

(Formula 4)

wherein $Z_1$ and $Z_2$ each represent any one of an allyl group, a methallyl group, a vinyl group, an acryl group, and a methacryl group; and
wherein the compound represented by formula (4) is dimethacryl carbonate.

2. A lithium ion secondary battery comprising:
a positive electrode, a negative electrode, a separator disposed between the positive electrode and the negative electrode, and an electrolyte,
wherein the electrolyte contains a compound represented by formula (4):

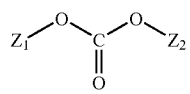

(Formula 4)

wherein $Z_1$ and $Z_2$ each represent any one of an allyl group, a methallyl group, a vinyl group, an acryl group, and a methacryl group;
wherein the electrolyte further comprises:
a cyclic carbonate compound represented by formula (1):

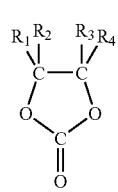

(Formula 1)

wherein $R_1$, $R_2$, $R_3$ and $R_4$ each represent any one of hydrogen, fluorine, chlorine, an alkyl group having 1 to 3 carbon atoms and a fluorinated alkyl group having 1 to 3 carbon atoms, a compound represented by formula (3):

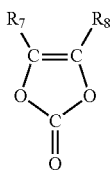

(Formula 3)

wherein $R_7$ and $R_8$ each represent any one of hydrogen, fluorine, chlorine, an alkyl group having 1 to 3 carbon atoms and a fluorinated alkyl group having 1 to 3 carbon atoms;

wherein the electrolyte further comprises a linear carbonate represented by formula (2):

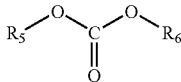

(Formula 2)

wherein $R_5$ and $R_6$ each represent any one of hydrogen, fluorine, chlorine, an alkyl group having 1 to 3 carbon atoms, and a fluorinated alkyl group having 1 to 3 carbon atoms; and wherein the compound represented by formula (1) is ethylene carbonate, the compound represented by formula (2) is at least one of ethyl methyl carbonate and dimethyl carbonate, the compound represented by formula (3) is vinylene carbonate, and the compound represented by formula (4) is dimethacryl carbonate.

3. A lithium ion secondary battery comprising:

a positive electrode, a negative electrode, a separator disposed between the positive electrode and the negative electrode, and an electrolyte, wherein the electrolyte contains a compound represented by formula (4):

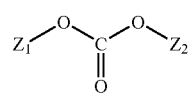

(Formula 4)

wherein $Z_1$ and $Z_2$ each represent any one of an allyl group, a methallyl group, a vinyl group, an acryl group, and a methacryl group;

wherein the electrolyte further comprises:

a cyclic carbonate compound represented by formula (1):

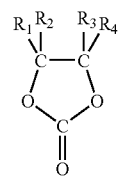

(Formula 1)

wherein $R_1$, $R_2$, $R_3$, and $R_4$ each represent any one of hydrogen, fluorine, chlorine, an alkyl group having 1 to 3 carbon atoms and a fluorinated alkyl group having 1 to 3 carbon atoms, a compound represented by formula (3):

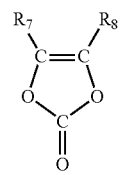

(Formula 3)

wherein $R_7$ and $R_8$ each represent any one of hydrogen, fluorine, chlorine, an alkyl group having 1 to 3 carbon atoms and a fluorinated alkyl group having 1 to 3 carbon atoms; and wherein compound represented by formula (4) is dimethacryl carbonate.

* * * * *